(12) United States Patent
Chae

(10) Patent No.: US 7,863,120 B2
(45) Date of Patent: Jan. 4, 2011

(54) LIQUID CRYSTAL DISPLAY DEVICE WITH DOUBLE METAL LAYER SOURCE AND DRAIN ELECTRODES AND FABRICATING METHOD THEREOF

(75) Inventor: Gee Sung Chae, Incheon-shi (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 11/648,831

(22) Filed: Jan. 3, 2007

(65) Prior Publication Data

US 2007/0109458 A1    May 17, 2007

Related U.S. Application Data

(62) Division of application No. 10/028,768, filed on Dec. 28, 2001, now Pat. No. 7,170,571.

(30) Foreign Application Priority Data

Mar. 21, 2001    (KR) .............................. P2001-14651

(51) Int. Cl.
*H01L 21/338* (2006.01)
(52) U.S. Cl. .............................. 438/167; 257/E21.407
(58) Field of Classification Search ................. 438/167; 257/E21.407
See application file for complete search history.

(56) References Cited

U.S. PATENT DOCUMENTS

| | | | | |
|---|---|---|---|---|
| 5,362,660 A | * | 11/1994 | Kwasnick et al. | ........... 438/158 |
| 5,539,219 A | * | 7/1996 | den Boer et al. | ............. 257/72 |
| 5,621,556 A | | 4/1997 | Fulks et al. | |
| 5,953,583 A | * | 9/1999 | Ban et al. | ..................... 438/30 |
| 6,078,365 A | | 6/2000 | Ueda et al. | |
| 6,255,706 B1 | | 7/2001 | Watanabe et al. | |
| 6,493,048 B1 | | 12/2002 | Baek et al. | |
| 6,529,251 B2 | | 3/2003 | Hibino et al. | |
| 6,531,392 B2 | | 3/2003 | Song et al. | |
| 2002/0135709 A1 | | 9/2002 | Sung Chae et al. | |
| 2003/0085404 A1 | | 5/2003 | Kim et al. | |

FOREIGN PATENT DOCUMENTS

| | | |
|---|---|---|
| CN | 1257304 A | 6/2000 |
| JP | 7-171347 A | 7/1995 |
| JP | 8-328041 A | 12/1996 |
| JP | 10-27910 A | 1/1998 |
| JP | 2000-208773 A | 7/2000 |
| JP | 2000-241832 A | 9/2000 |
| JP | 2000-307118 A | 11/2000 |
| JP | 2000-349294 A | 12/2000 |

* cited by examiner

*Primary Examiner*—Charles D Garber
*Assistant Examiner*—Stanetta D Isaac
(74) *Attorney, Agent, or Firm*—Birch, Stewart, Kolasch & Birch LLP

(57) ABSTRACT

A method of fabricating a liquid crystal display device includes, according to an embodiment of the present invention, forming a gate electrode on a substrate, forming a gate insulating layer over the gate electrode and on the substrate, forming a first metal layer on the first semiconductor layer and a second metal layer over the first metal layer, forming source and chain electrode by patterning a separation region in the first and second metal layers, and patterning the first metal layer and the first semiconductor layer in the same pattern.

7 Claims, 14 Drawing Sheets

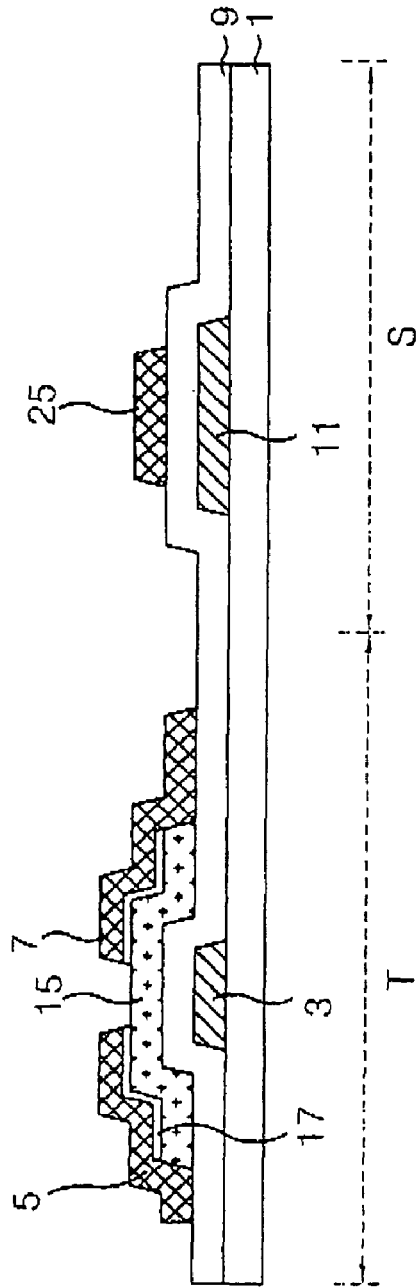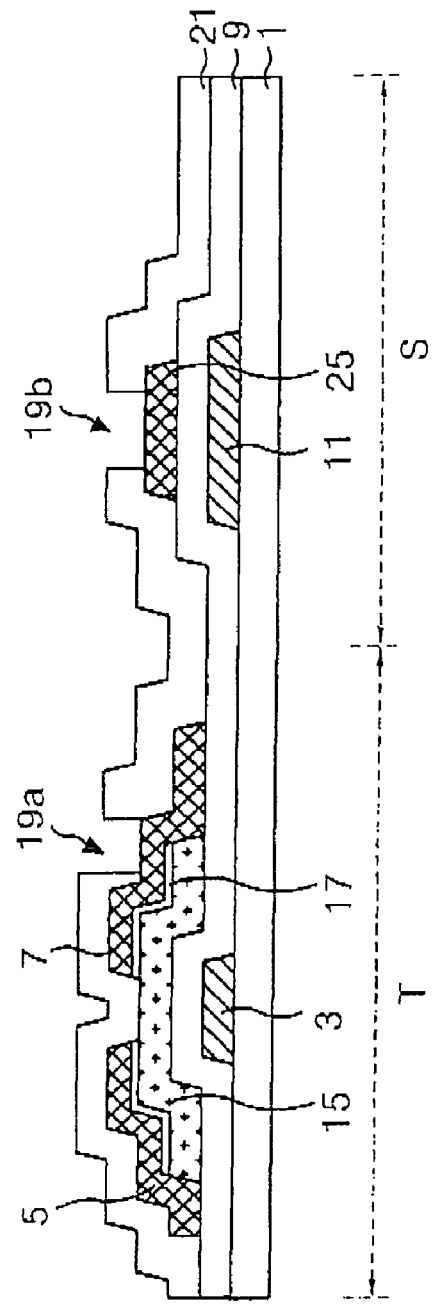

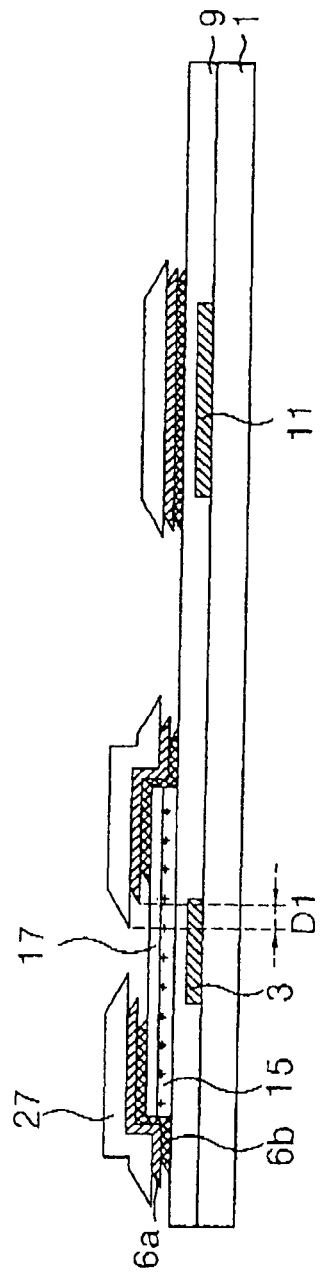
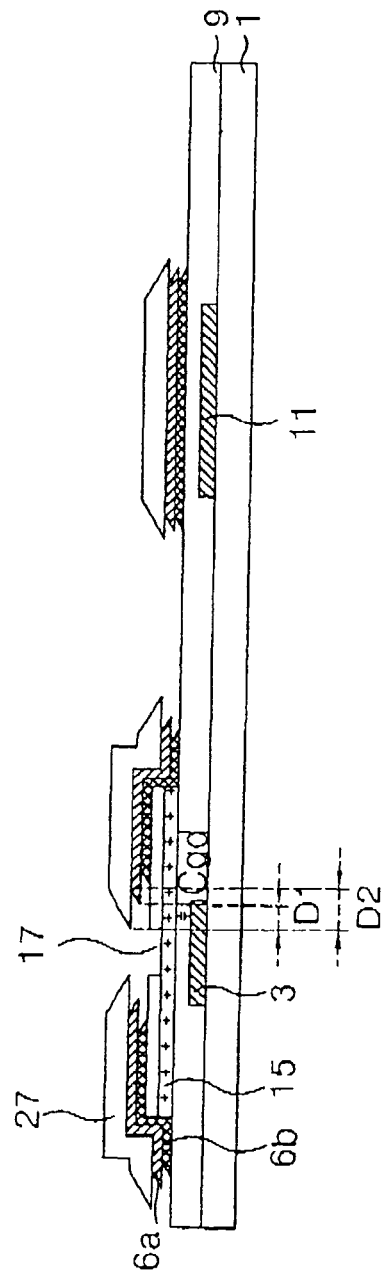
FIG. 4A CONVENTIONAL ART
FIG. 4B CONVENTIONAL ART

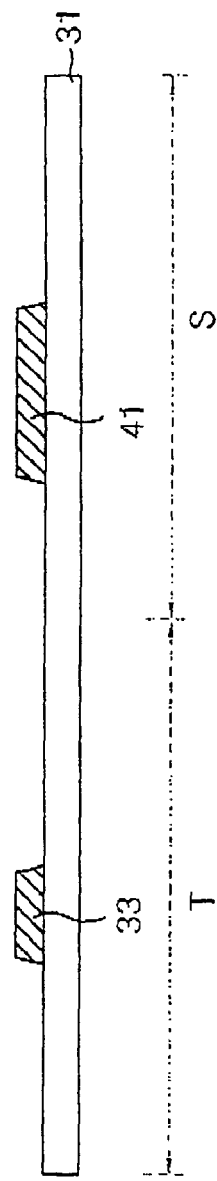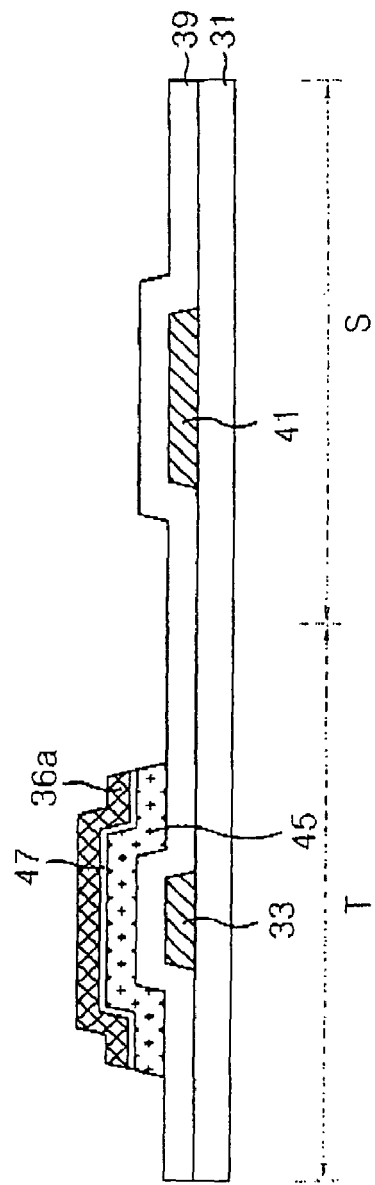

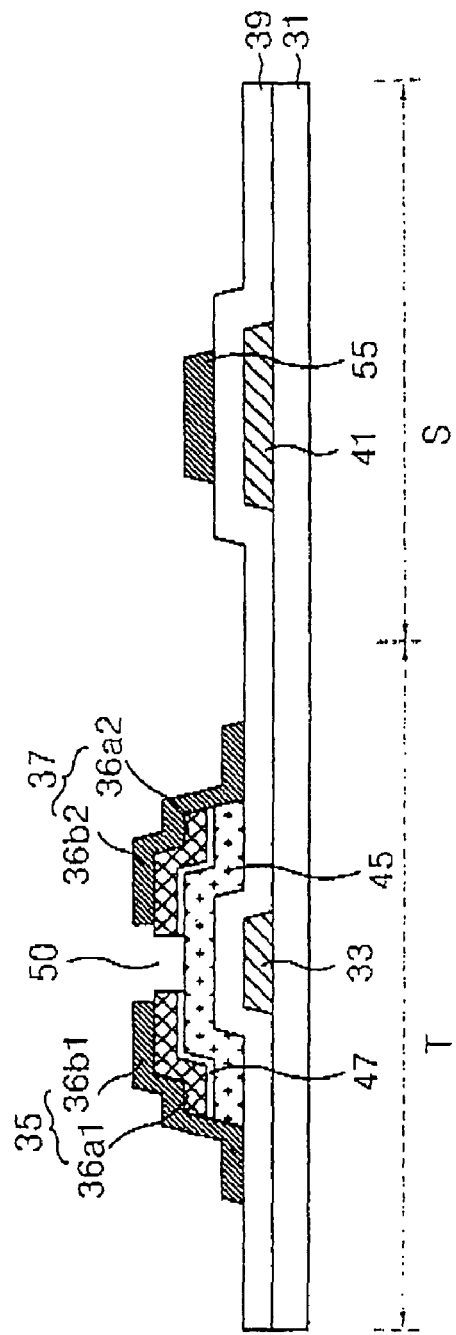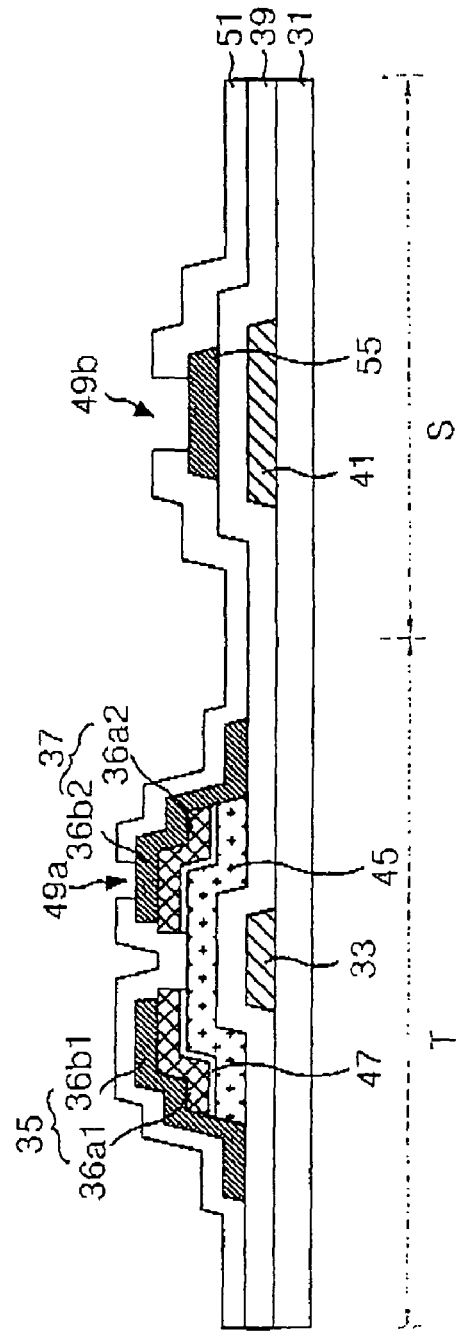

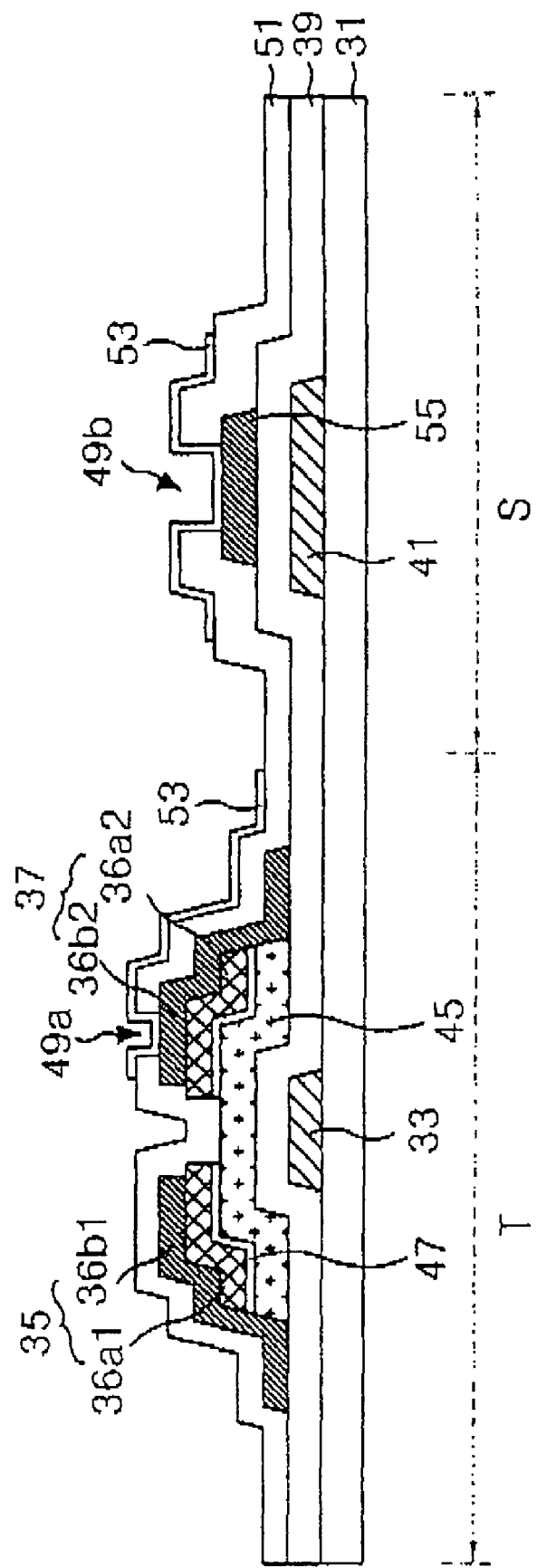

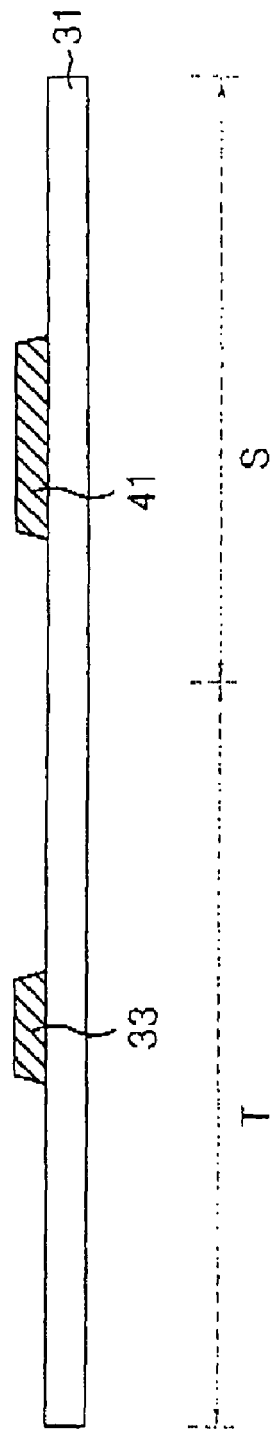
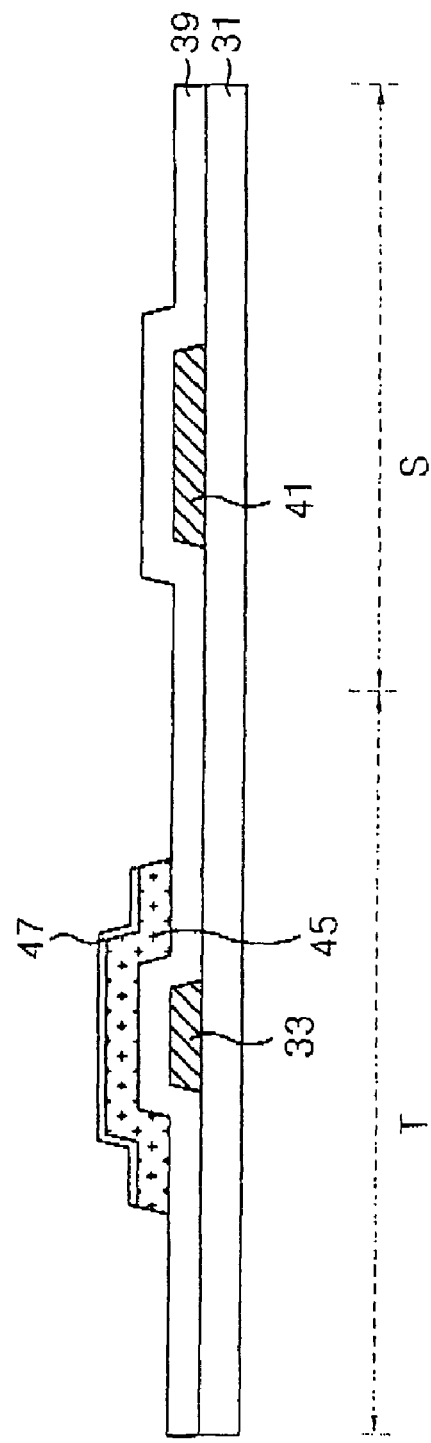

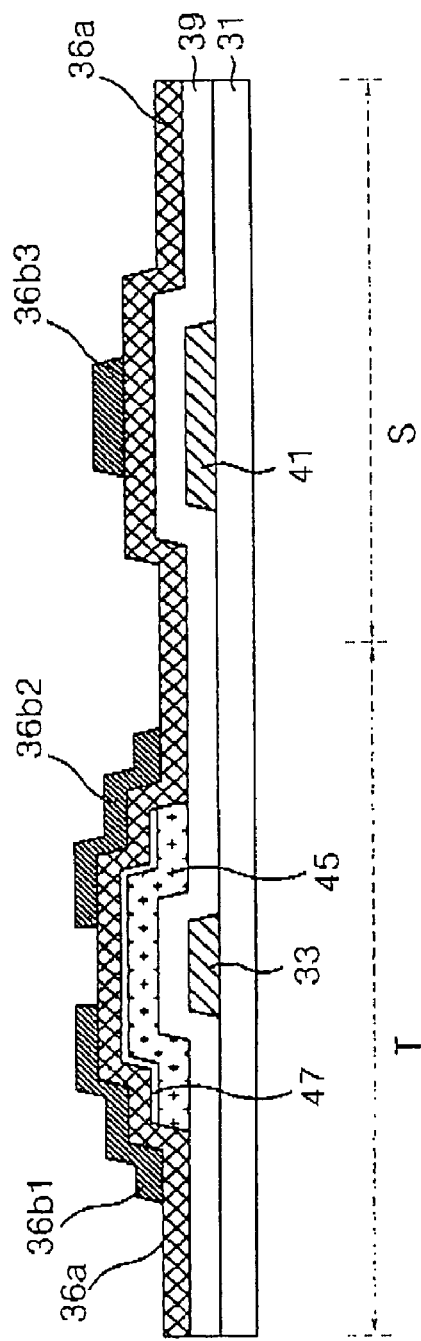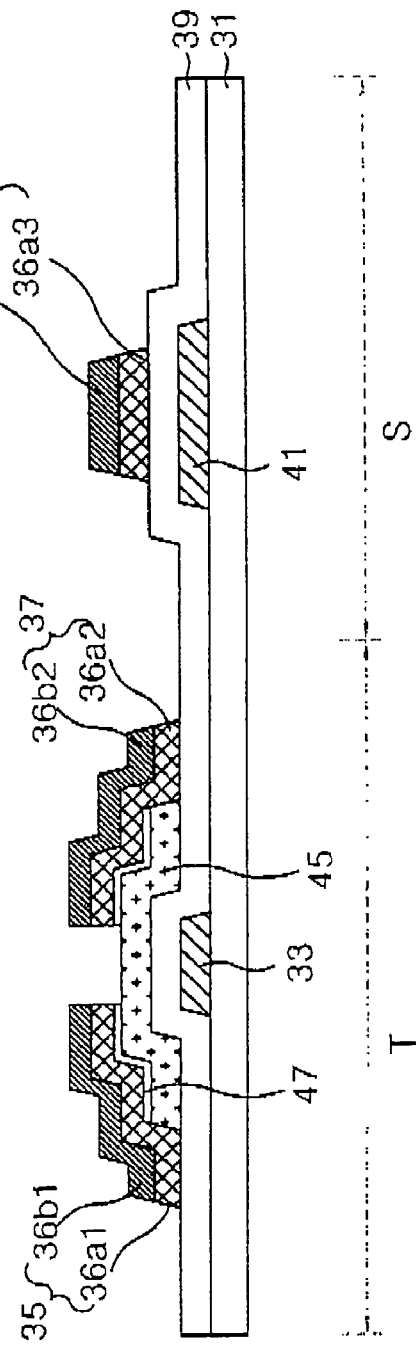

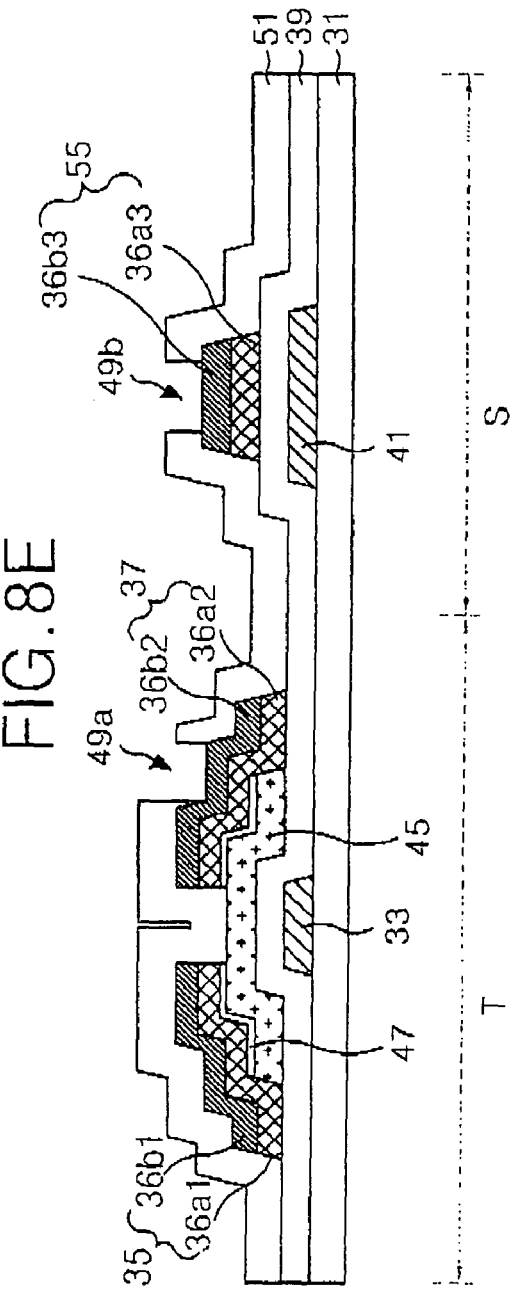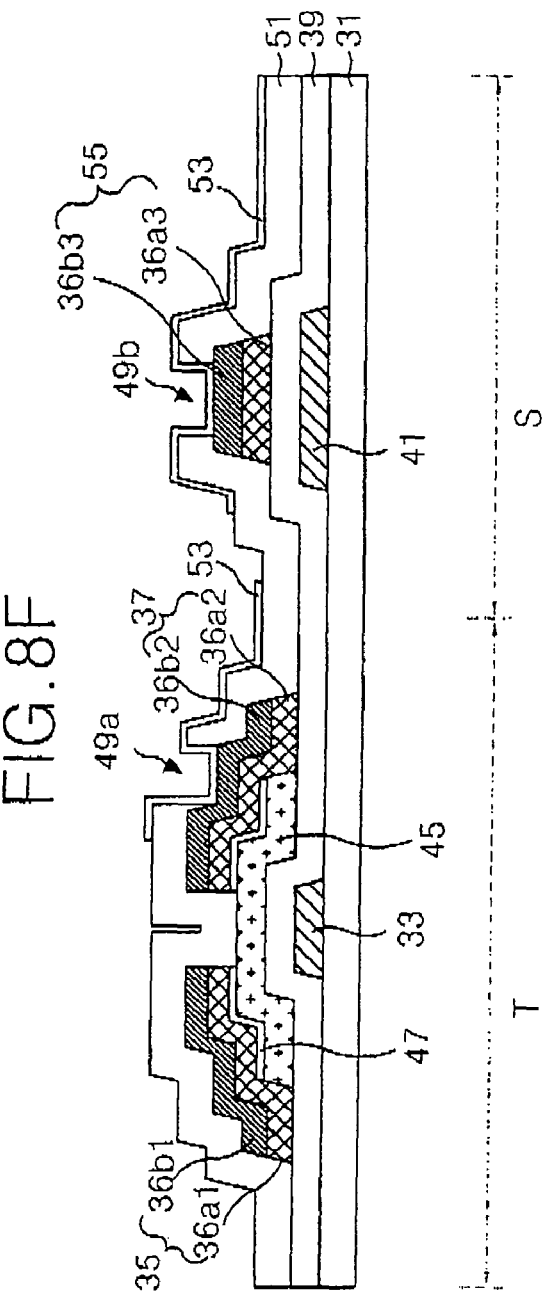

LIQUID CRYSTAL DISPLAY DEVICE WITH DOUBLE METAL LAYER SOURCE AND DRAIN ELECTRODES AND FABRICATING METHOD THEREOF

This application is a Divisional of application Ser. No. 10/028,768, filed on Dec. 28, 2001 now U.S. Pat. No. 7,170,571, now allowed, and for which priority is claimed under 35 U.S.C. §120; and this application claims priority of Application No. 2001/14651 filed in Korea on Mar. 21, 2001 under 35 U.S.C. §119; the entire contents of all are hereby incorporated by reference.

BACKGROUND OF THE INVENTION

1. Field of the Invention

This invention relates to a liquid crystal display, and more particularly, a liquid crystal display device and a fabricating method thereof with double metal layer source and drain electrodes.

2. Description of the Background Art

Generally, a liquid crystal display (LCD) controls light transmittance using an electric field to display a picture. To this end, the LCD includes a liquid crystal panel having liquid crystal cells arranged in a matrix type, and a driving circuit for driving the liquid crystal panel. The liquid crystal panel is provided with pixel electrodes for applying an electric field to each liquid crystal cell, and a common electrode. Typically, the pixel electrode is provided on a lower substrate for each liquid crystal cell, whereas the common electrode is integrally formed on the entire surface of an upper substrate. Each of the pixel electrodes is connected to a thin film transistor (TFT) used as a switching device. The pixel electrode drives the liquid crystal cell, along with the common electrode, in accordance with a data signal applied via the TFT.

FIGS. 1 and 2 depict an LCD of the conventional art. As shown, a lower substrate 1 of the LCD includes a TFT T arranged at an intersection between a data line 13 and a gate line 11, a pixel electrode 23 connected to a drain electrode 7 of the TFT, and a storage capacitor S positioned at an overlapping portion between the pixel electrode 23 and the pre-stage gate line 11.

The TFT T includes a gate electrode 3 connected to the gate line 11, a source electrode 5 connected to the data line 13, and a drain electrode 7 connected, via a drain contact hole 19a, to the pixel electrode 23. Further, the TFT T includes semiconductor layers 15 and 17 for defining a channel between the source electrode 5 and the drain electrode 7 by a gate voltage applied to the gate electrode 3. Such a TFT T responds to a gate signal from the gate line 11 to selectively apply a data signal from the data line 13 to the pixel electrode 23.

The pixel electrode 23 is positioned at a cell area divided by the data line 13 and the gate line 11 and is made from a transparent conductive material having a high light transmittance. The pixel electrode 23 generates a potential difference from a common transparent electrode (not shown) provided at an upper substrate (not shown) by a data signal applied via the drain contact hole 19a. By this potential difference, a liquid crystal positioned between the lower substrate 1 and the upper substrate (not shown) is rotated due to its dielectric anisotropy. Thus, the liquid crystal allows a light applied, via the pixel electrode 23, from a light source to be transmitted into the upper substrate.

The storage capacitor S charges a voltage in an application period of a gate high voltage to the pre-stage gate line 11 while discharging the charged voltage in an application period of a data signal to the pixel electrode 23. This prevents a voltage variation in the pixel electrode 23. The storage capacitor S includes a gate line 11 and a storage electrode 25. The storage electrode 25 overlaps the gate line 11, and a gate insulating film 9 is positioned between the storage electrode 25 and the gate line 11. Further, the storage capacitors is electrically connected to the pixel electrode 23 via a storage contact hole 19b defined by a protective film 21.

Hereinafter, a conventional method of fabricating the lower substrate 1 of the LCD having the above-mentioned configuration will be described. The conventional method is depicted in FIGS. 3A-3E.

First, a gate metal layer is deposited onto the lower substrate 1 and patterned to form the gate line 11 and the gate electrode 3, as shown in FIG. 3A. An insulating material is entirely deposited onto the lower substrate 1 in such a manner to cover the gate line 11 and the gate electrode 3. The insulating material forms the gate insulating film 9 shown in FIG. 3B. First and second semiconductor materials are sequentially deposited onto the gate insulating film 9 and then patterned to form an active layer 15 and an ohmic contact layer 17.

Subsequently, as shown in FIG. 3C, a data metal layer is deposited onto the gate insulating film 9 and patterned to form the storage electrode 25, the source electrode 5 and the drain electrode 7. Thereafter, as shown in FIG. 3D, a protective film 21 is formed on the gate insulating film 9. The protective film 21 is then patterned to define the drain contact hole 19a and the storage contact hole 19b in such a manner to expose the drain electrode 7 and the storage electrode 25.

Subsequently, as shown in FIG. 3E, a transparent conductive material is deposited onto the protective film 21 and patterned to form the pixel electrode 23 such that the pixel electrode electrically contacts the drain electrode 7 and the storage electrode 25.

The source electrode 5 and the drain electrode 7 provided on the lower substrate 1 of such a LCD device are formed from a data metal layer such as chrome (Cr) or molybdenum (Mo) in a single layer structure.

FIGS. 4A-4B depict another conventional LCD device which trends towards a relatively higher resolution than the conventional LCD device of FIGS. 1 and 2. As shown, when the device trends toward a relatively higher resolution, the data metal layer has a double layer structure of first and second metal layers 6a and 6b. The first metal layer 6a is made from a metal such as molybdenum (Mo) or titanium (Ti) while the second metal layer 6b is made from a material such as aluminum (Al) or an aluminum alloy.

When the data metal layer having the double layer structure is patterned by the wet etching, it may be over-etched by a certain area D1 in comparison to a photo resist pattern 27. When this occurs, if the ohmic contact layer 17 at a portion corresponding to the gate electrode 3 is patterned by the wet etching with the aid of the photo resist pattern 27, the active layer 15 is exposed as shown in FIG. 4B. This creates a parasitic capacitance Cgd between the gate metal layer, and the data metal layer has a deviation equal to about D2 due to the over-etched data metal layer, which results in increased difficulty in obtaining uniform picture quality.

SUMMARY OF THE INVENTION

Accordingly, it is an object of the present invention to provide a liquid crystal display device and a fabricating method thereof that is adaptive for improving a picture quality.

In order to achieve these and other objects of the invention, a liquid crystal display device according to one aspect of the present invention includes a gate electrode provided on a substrate; a gate insulating film provided on the substrate; a semiconductor layer provided on the gate insulating film; a buffer metal layer formed in the same pattern as the semiconductor layer; and source and drain electrodes formed from a data metal layer on the buffer metal layer and the gate insulating film.

The liquid crystal display device further includes a protective layer provided on the gate insulating film; and a pixel electrode provided on the protective layer.

In the liquid crystal display device, the semiconductor layer includes an active layer provided on the gate insulating film; and an ohmic contact layer provided on the active layer with having a desired distance of holes therebetween.

The buffer metal layer is formed in the same pattern as the ohmic contact layer.

Tn the buffer metal layer is made from any one of molybdenum (Mo) and titanium (Ti).

The data metal layer is made from any one of aluminum (Al), an Al alloy, copper (Cu) and a Cu alloy.

The data metal layer is patterned by a wet etching.

The buffer metal layer and the ohmic contact layer are patterned by a dry etching.

A method of fabricating a liquid crystal display device according to another aspect of the present invention includes the steps of forming a gate electrode on a substrate; forming a gate insulating film on the substrate; forming a semiconductor layer and a buffer metal layer on the gate insulating film in the same pattern; and forming source and drain electrodes from a data metal layer on the gate insulating film.

The method further includes the steps of forming a protective layer on the gate insulating film; and forming a pixel electrode on the protective layer.

In the method, the semiconductor layer and the buffer metal layer are patterned by a dry etching.

The source and drain electrodes are patterned by a wet etching.

The buffer metal layer is made from any one of molybdenum (Mo) and titanium (Ti).

The data metal layer is made from any one of aluminum (Al), an Al alloy, copper (Cu) and a Cu alloy.

A method of fabricating a liquid crystal display device according to still another aspect of the present invention includes the steps of forming a gate electrode on a substrate; forming a gate insulating film on the substrate; forming a semiconductor layer on the gate insulating film; and forming source and drain electrodes by depositing first and second metal layers on the gate insulating film and then patterning the second metal layer by a wet etching and patterning the semiconductor layer and an ohmic contact layer of the semiconductor layer by a dry etching.

The method further includes the steps of forming a protective layer on the gate insulating film; and forming a pixel electrode on the protective layer.

In the method, the first metal layer is made from any one of molybdenum (Mo) and titanium (Ti).

The second metal layer is made from any one of aluminum (Al), an Al alloy, copper (Cu) and a Cu alloy.

These and other objects of the present application will become more readily apparent from the detailed description given hereinafter. However, it should be understood that the detailed description and specific examples, while indicating preferred embodiments of the invention, are given by way of illustration only, since various changes and modifications with in the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIGS. 3A to 3E are section views depicting a conventional process of fabricating the lower substrate of the conventional LCD of FIG. 2;

FIGS. 4A and 4B are section views depicting a process of forming the source and drain electrodes of a second conventional LCD device according to a second conventional method;

FIGS. 6A to 6E depict section views of one embodiment of a method of fabricating the lower substrate of the LCD of FIG. 5;

FIGS. 8A to 8F are section views depicting a second embodiment of a method of fabricating the lower substrate of the LCD of FIG. 7.

DETAILED DESCRIPTION OF THE PREFERRED EMBODIMENTS

Figure 1:
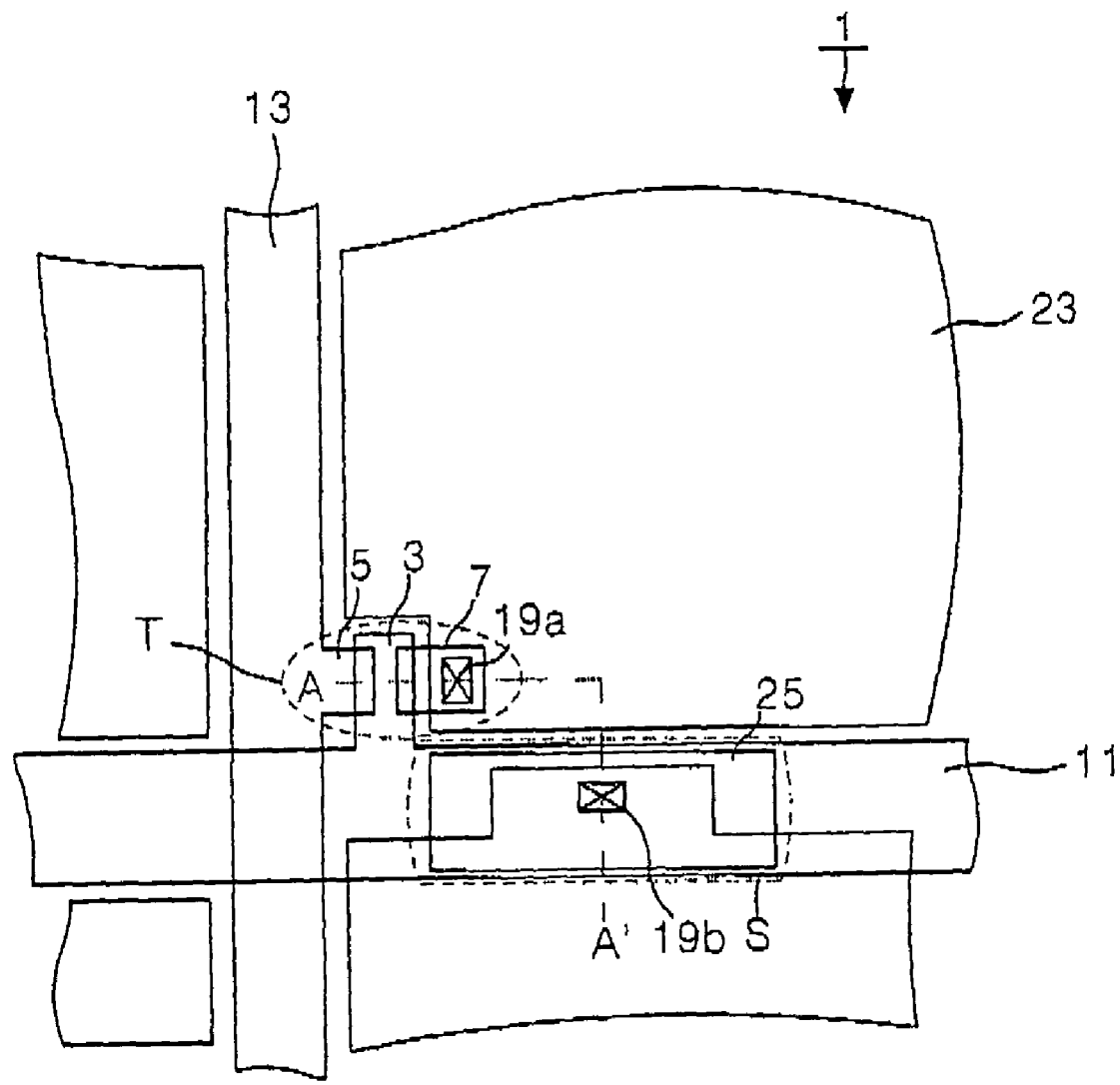
FIG. 1 is a plan view depicting a structure of a lower substrate of a conventional LCD device.
Figure 2:
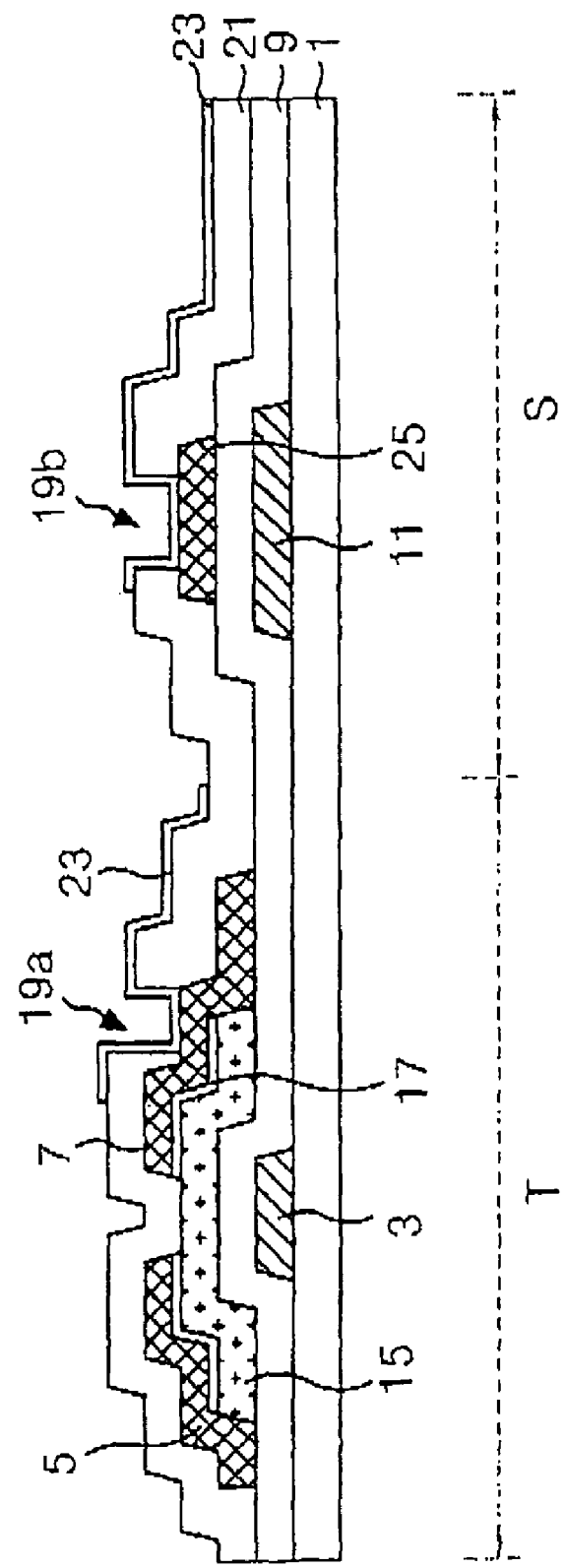
FIG. 2 is a section view depicting the lower substrate of the LCD device of FIG. 1 taken along the A-A line.
Figure 3A:
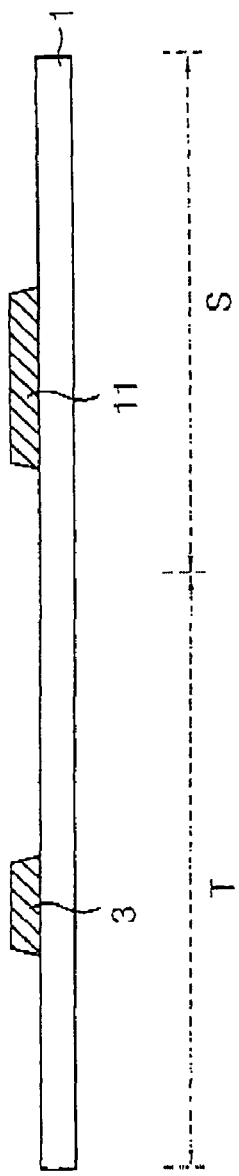
Figure 3B:
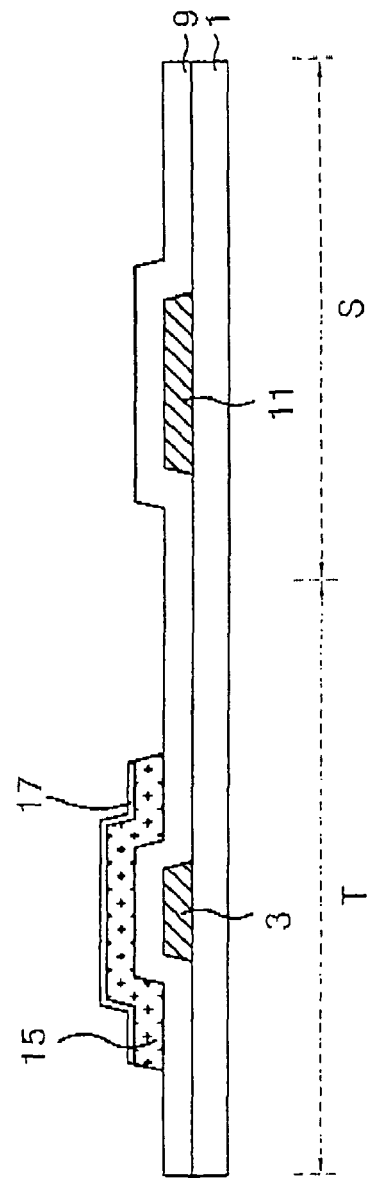
Figure 3E:
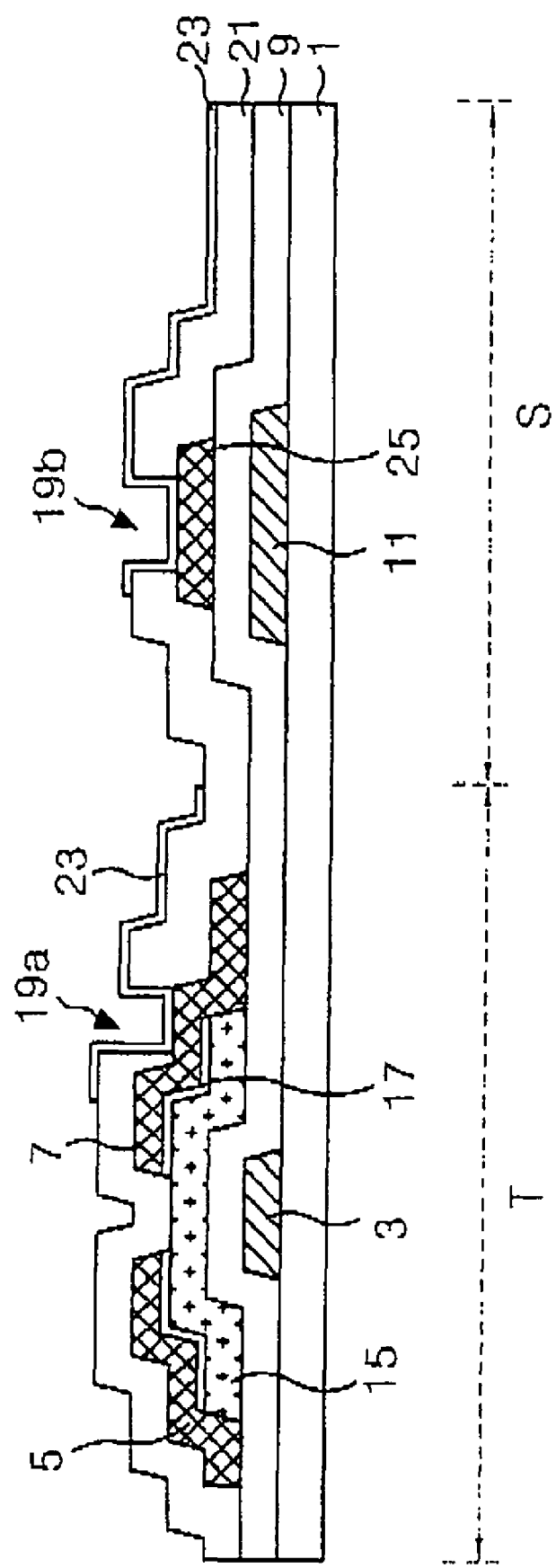
Figure 5:
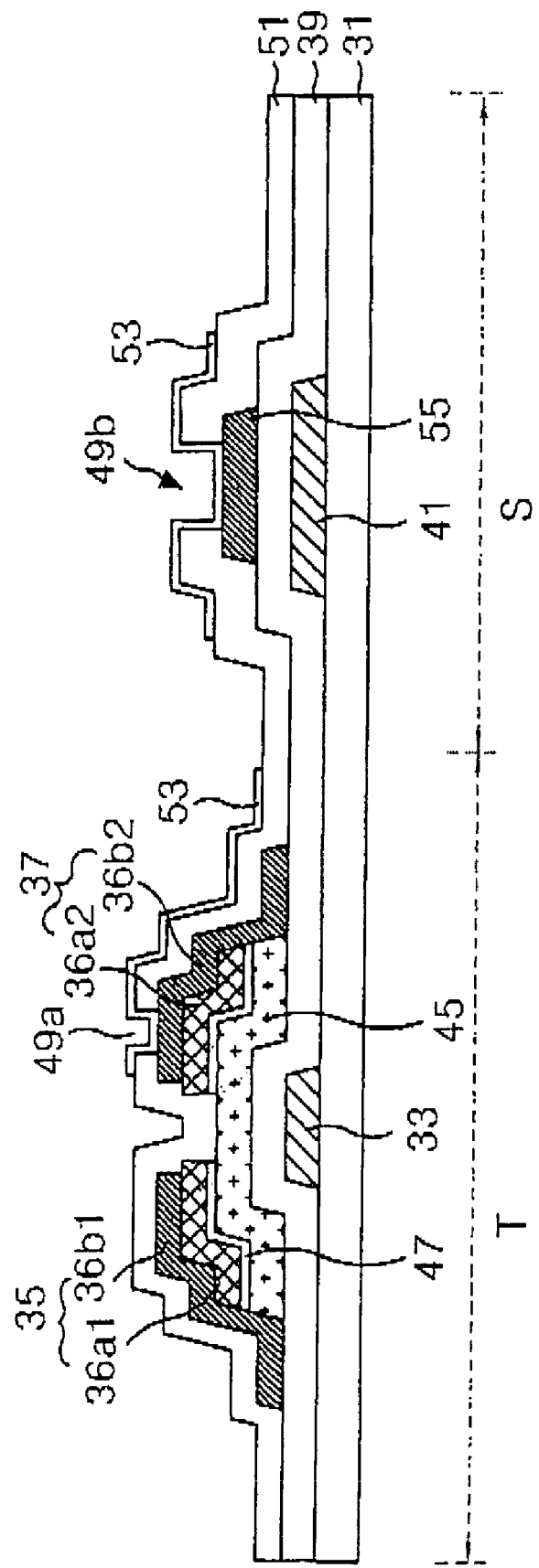
FIG. 5 is a section view depicting a structure of a lower substrate of a LCD device according to a first embodiment of the present invention.

FIG. 5 is a section view showing a structure of a lower substrate 31 of a LCD according to a first embodiment of the present invention.

Referring to FIG. 5, the thin film transistor part of substrate 31 includes a gate electrode 33, an active layer 45, an ohmic contact layer 47 and a gate insulating film 39 between the gate electrode 33 and the ohmic contact layer 47. Source and drain electrodes 35 and 37, respectively, are above the ohmic contact layer 47.

The source and drain electrodes 35 and 37 include a data metal layer 36b formed separately on the buffer metal layer 36a. The buffer metal layer 36a is formed in the same pattern as the ohmic contact layer 47. The data metal layer 36b is formed on the buffer metal layer 36a and the gate insulating film 39. The buffer metal layer 36a may be made from Mo or Ti, etc. while the data metal layer 36b may be made from Al, an Al alloy, copper (Cu) or a Cu alloy, etc.

To protect such a thin film transistor part, a protective layer 51 is provided. A pixel electrode 53 is formed on the protective layer 51. The pixel electrode 53 is in contact with the drain electrode 37 via a drain contact hole 49a, which passes through the protective layer 51.

During operation of the LCD device, the pixel electrode 53 generates a potential difference from a common electrode (not shown) provided at an upper substrate (not shown) by a data signal applied via the drain contact hole 49a. By this potential difference, a liquid crystal positioned between the lower substrate 31 and the upper substrate (not shown) is rotated due to its dielectric anisotropy. Thus, the liquid crystal allows a light applied from a light source to be transmitted into the upper substrate.

The storage capacitor part of the LCD device includes a gate line 41, and a storage electrode 55 above the gate line 41, and a gate insulating film 39 therebetween. The storage electrode 55 may be formed from the same material as data metal layer 36b. The storage electrode 55 is electrically connected to the pixel electrode 53, via a storage contact hole 49b passing through the protective film 51.

During the operation of the LCD device, the storage capacitor part charges a voltage in an application period of a gate high voltage to the gate line 41 (pre-stage) while discharging the charged voltage in an application period of a data signal to the pixel electrode 53. This method of operation prevents a voltage variation in the pixel electrode 53.

FIGS. 6A to 6E depict one embodiment of a method of fabricating the lower substrate 31 of the LCD device in FIG. 5.

Referring to FIG. 6A, the gate line 41 and the gate electrode 33 are positioned on the lower substrate 31. The gate line 41 and the gate electrode 33 are formed by depositing a material such as aluminum (Al) or copper (Cu) onto the lower substrate 31 by a deposition technique such as a sputtering, etc. and patterning the material.

Referring to FIG. 6B, the active layer 45, the ohmic contact layer 47 and the buffer metal layer 36a are provided on the gate insulating film 39. The gate insulating film 39 is formed by depositing an insulating material entirely over the lower substrate 31 using, for example, the plasma enhanced chemical vapor deposition (PECVD) technique in such a manner to cover the gate line 41 and the gate electrode 33. The active layer 45, the ohmic contact layer 47 and the buffer metal layer 36a are formed by sequentially depositing first and second semiconductor materials and a buffer metal material onto the gate insulating film 39, and patterning the materials simultaneously in the same pattern.

The gate insulating film 39 is made from an insulating material such as silicon nitride ($SiN_x$) or silicon oxide ($SiO_x$). The active layer 45 is formed from a first semiconductor layer of amorphous silicon, which is not doped with an impurity. On the other hand, the ohmic contact layer 47 is formed from a second semiconductor layer of amorphous silicon doped with an n-type or p-type impurity. The buffer metal layer 36a is formed from a buffer metal such as Mo or Ti, etc.

Referring to FIG. 6C, the storage electrode 55 and the data metal layer 36b of the source electrode 35 and the drain electrode 37 are provided on the gate insulating film 39. The storage electrode 55, the data metal layer 36b of the source electrode 35 and the drain electrode 37 are formed by depositing a metal layer entirely over the structure of FIG. 6B using the chemical vapor deposition technique or sputtering technique. The separation region 50 the data metal layer 36b, and the source and drain electrodes 35 and 37 are formed by the patterning using a wet etch. The patterning is performed so that the separation region is above the gate electrode 33. Thereafter, in the area of the separation region 50, the buffer metal layer 36a and the ohmic contact layer 47 at a portion corresponding to the gate electrode 33 are patterned by dry etching to expose the active layer 45. The dry etch is performed using the data metal layer 36b as a mask. The exposed portion of the active layer 45 corresponding to the gate electrode 33 and between the source and drain electrodes 35 and 37 defines a channel.

The storage electrode 55 and the data metal layer 36b may be formed from a data metal layer of Al, an Al alloy, Cu or a Cu alloy, etc.

Referring to FIG. 6D, the protective layer 51 is provided on the gate insulating layer 39, source and drain electrodes 35 and 37, the storage electrode 55 and channel. The protective layer 51 is formed by depositing an insulating material onto the structure of FIG. 6C and patterning the insulating material in such a manner to cover the storage electrode 55, the source electrode 35 and the drain electrode 37. The drain contact hole 49a and the storage contact hole 49b are formed in the protective layer 51 to partially expose the surfaces of the drain electrode 37 and the storage electrode 55.

The protective layer 51 includes an inorganic insulating material such as silicon nitride ($SiN_x$) or silicon oxide ($SiO_x$), or an organic insulating material such as an acrylic organic compound, TEFLON, BCB (benzocyclobutene), Cytop or PFCB (perfluorocyclobutane).

As shown in FIG. 6E, a pixel electrode 53 is provided on the protective layer 51. The pixel electrode 53 is formed by depositing a transparent conductive material onto the protective layer 51 and patterning the material. The pixel electrode 53 is formed so that it is in electrical contact with the drain electrode 37 through the drain contact hole 49a while being in electrical contact with the storage electrode 55 through the storage contact hole 49b. The pixel electrode 53 is formed from a transparent conductive material such as indium-tin-oxide (ITO), indium-zinc-oxide (IZO) or indium-tin-zinc-oxide (ITZO).

As discussed above, the source and drain electrodes 35 and 37 are formed by patterning the data metal layer 36b using wet etching. Then, the channel is formed using the metal layer pattern as a mask to dry etch the buffer metal layer 36a and the ohmic contact layer 47 at a portion corresponding to the gate electrode 33. Accordingly, an over-etching of the source and drain electrodes 35 and 37 caused by a patterning work of the conventional wet etching is prevented. This can eliminate a phase deviation of a parasitic capacitance Cgd between the drain terminal and the gate terminal.

Alternatively, the data metal layer 36b of the source and drain electrodes 35 and 37 may be patterned by the wet etching, and thereafter, the buffer metal layer 36a and the ohmic contact layer 47 may be patterned using the photoresist used to pattern the data metal layer 36b as a mask for the dry etching.

Figure 7:
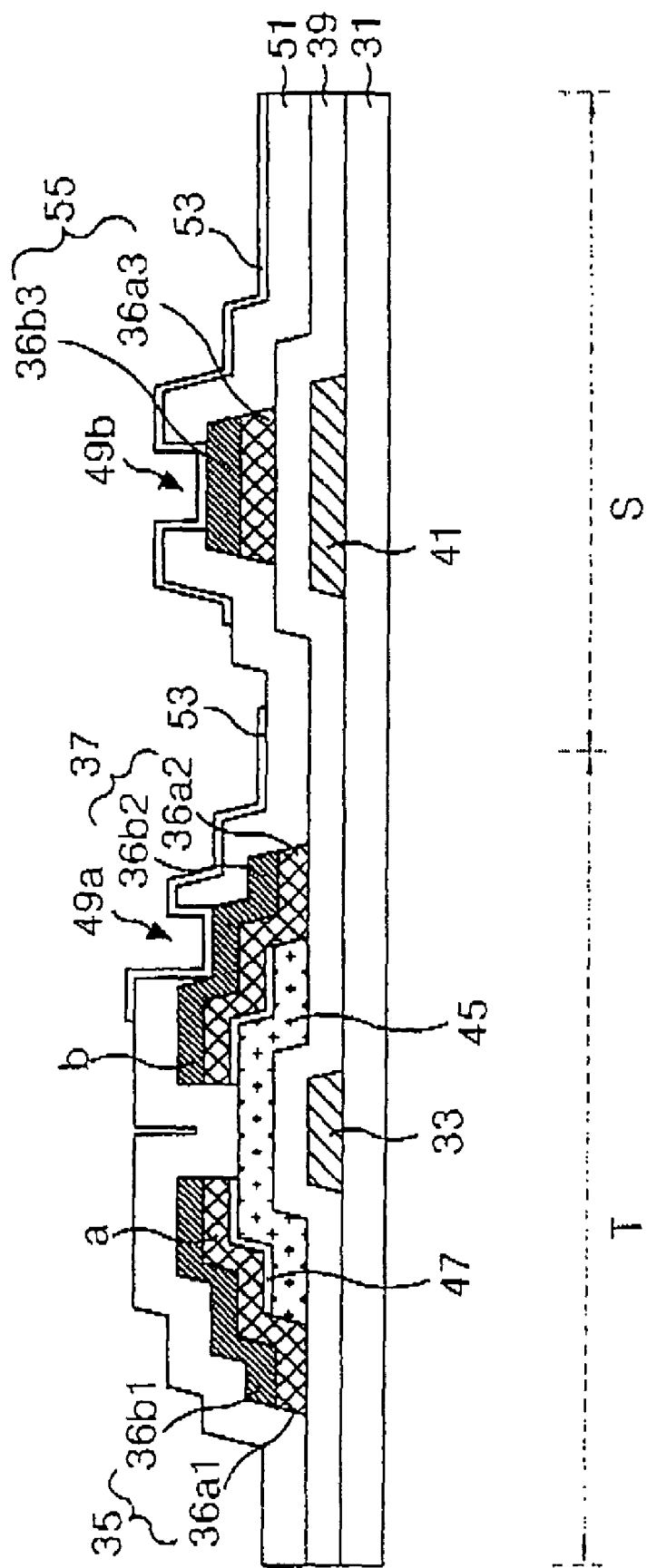
FIG. 7 is a section view depicting a structure of a lower substrate of a LCD device according to a second embodiment of the present invention.

FIG. 7 is a section view showing a structure of a lower substrate of a liquid crystal display according to a second embodiment of the present invention.

The LCD device depicted in FIG. 7 has similar elements as the LCD device shown in FIG. 5 except for the inclusion of the double-layered storage electrode 55 and the structural differences in the metal layers 36a and 36b and pixel electrode 53 in contact hole 49a. As shown in FIG. 7, the data metal layer 36b and buffered metal layer 36a are patterned the same. For example, the end portions a and b of layers 36a and 36b which abut the channel region are the same length. Also, both layers 36a and 36b extend wider than the active layer 45. Regarding the pixel electrode 53, in pixel electrode FIG. 7, the pixel electrode 53 lines the entire contact hole 49a.

FIG. 8A to FIG. 8F depict one embodiment of a method of fabricating the lower substrate 31 of the LCD device in FIG. 7.

Referring to FIG. 8A, the gate line 41 and the gate electrode 33 are provided on the lower substrate 31. The gate line 41 and the gate electrode 33 may be formed by depositing a material such as aluminum (Al) or copper (Cu) onto the lower substrate 31 by a deposition technique such as a sputtering, etc. and patterning the material.

Referring to FIG. 8B, the active layer 45 and the ohmic contact layer 47 are provided on the gate insulating film 39.

The gate insulating film 39 is formed by depositing an insulating material entirely over the lower substrate 31 using a technique such as plasma enhanced chemical vapor deposition (PECVD) in such a manner to cover the gate line 41 and the gate electrode 33. The gate insulating film 39 may be made from an insulating material such as silicon nitride ($SiN_x$) or silicon oxide ($SiO_x$).

The active layer 45 and the ohmic contact layer 47 are formed by depositing first and second semiconductor layers onto the gate insulating film 39 and patterning the layers.

The active layer 45 is formed from a first semiconductor layer of amorphous silicon without being doped with an impurity. On the other hand, the ohmic contact layer 47 is formed from a second semiconductor layer of amorphous silicon doped with an n-type or p-type impurity.

Referring to FIG. 8C, the buffer metal layer 36a and the data metal layer 36b are provided on the gate insulating film 39 and ohmic contact layer 47. The buffer metal layer 36a is formed by depositing a buffer metal over the entire gate insulating film 39 and ohmic contact layer 47. The data metal layer 36b is formed by depositing a data metal entirely over the buffer metal layer 36a and then patterning the data metal layer 36b. The buffer metal layer 36a may be formed from a buffer metal such as Mo or Ti, etc. The data metal layer 36b may be formed from a data metal such as Al, an Al alloy, Cu or a Cu alloy.

Referring to FIG. 8D, the storage electrode 55, the source electrode 35 and the drain electrode 37 are formed on the gate insulating film 39. The storage electrode 55, the source electrode 35 and the drain electrode 37 are formed from the data metal layer 36b and the buffer metal layer 36a patterned by dry etching utilizing the data metal layer 36b as a mask. As a result, the data metal layer 36b and the buffer metal layer 36a are formed in the same pattern. The ohmic contact layer 47 at a portion above and corresponding to the gate electrode 33 is also patterned by the dry etching to expose the active layer 45. The patterning of the portion of the ohmic contact layer 45 makes a channel between the source and drain electrodes 35 and 37.

Referring to FIG. 8E, a protective layer 51 is formed by depositing an insulating material onto the source electrode 35, drain electrode 37, storage electrode 55 and gate insulating layer 39. The insulating material is then patterned in such a manner to cover the storage electrode 55, the source electrode 35 and the drain electrode 37. The patterning the drain contact hole 49a and the storage contact hole 49b so as to pass through the protective layer 51 and partially expose the surfaces of the drain electrode 37 and the storage electrode 55.

The protective layer 51 is made from an inorganic insulating material such as silicon nitride ($SiN_x$) or silicon oxide ($SiO_x$), or an organic insulating material such as an acrylic organic compound, TEFLON, BCB (benzocyclobutene), Cytop or PFCB (perfluorocyclobutane).

Referring to FIG. 8F, the pixel electrode 53 is provided on the protective layer 51 in contact holes 49a and 49b. The pixel electrode 53 is in electrical contact with the drain electrode 37 through the drain contact hole 49a while being in electrical contact with the storage electrode 55 through the storage contact hole 49b.

The pixel electrode 53 is formed by depositing a transparent conductive material onto the protective layer 51 and then patterning the material. A conductive material such as indium-tin-oxide (ITO), indium-zinc-oxide (IZO) or indium-tin-zinc-oxide (ITZO) is used for the pixel electrode.

As discussed above, the source and drain electrodes 35 and 37 are formed from the buffer metal layer 36a and the data metal layer 36b. The source and drain electrodes 35 and 37 are formed by patterning the data metal layer 36b by the wet etching and then patterning the buffer metal layer 36a and the ohmic contact layer 47 by the dry etching using the data metal layer 36b as a mask. As a result, the buffer metal layer 36a is formed in the same pattern as the data metal layer 36b, and the ohmic contact layer 47 at a portion corresponding to the gate electrode 33 also is patterned by the dry etching to expose the active layer 45. Accordingly, an over-etching of the source and drain electrodes 35 and 37 caused by patterning work using only the conventional wet etching can be prevented. This can eliminate a phase deviation of a parasitic capacitance Cgd between the drain terminal and the gate terminal. Thus, the parasitic capacitance of the TFT has an uniform distribution, and flicker and a crosstalk can be reduced to obtain a uniform picture quality.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A method of fabricating a liquid crystal display device, the method comprising the steps of:
   forming a gate electrode on a substrate;
   forming a gate insulating film over the gate electrode and on the substrate;
   forming a first semiconductor layer over the gate insulating film;
   forming a second semiconductor layer over the first semiconductor layer;
   forming a first metal layer on the second semiconductor layer and a second metal layer over the first metal layer;
   patterning the second metal layer by using a wet etch process;
   patterning the first metal layer and the second semiconductor layer in a same pattern with the patterned second metal layer by using a dry etch process by using the patterned second metal layer as a mask;
   forming a protective layer on the second metal layer; and
   forming a pixel electrode on the protective layer,
   wherein etched side walls of the first metal layer and the second semiconductor layer are substantially aligned with the side wall of the second metal layer.

2. The method device as claimed in claim 1, wherein the first metal layer is formed from molybdenum (Mo) or titanium (Ti).

3. The method as claimed in claim 1, wherein the data metal layer is formed from aluminum (Al), an Al alloy, copper (Cu) or a Cu alloy.

4. The method of claim 1, wherein the step of patterning the first metal layer and the first semiconductor layer includes dry etching the first semiconductor layer and the first metal layer and further includes using the second metal layer as a mask.

5. A method of fabricating a liquid crystal display device, the method comprising the steps of:
   forming a gate electrode on a substrate;
   forming a gate insulating film on the substrate;
   forming a first semiconductor layer over the gate insulating film;
   forming a second semiconductor layer over the first semiconductor layer;
   forming a first metal layer on the second semiconductor layer and a second metal layer over the first metal layer, wherein the second semiconductor layer is connected with the first semiconductor layer and the first metal layer;

patterning the second metal layer by wet etching to form a first separation region in the second metal layer;

patterning the second semiconductor layer and the first metal layer by using the patterned second metal layer as a mask by dry etching to form a second separation identical to the first separation region in the second semiconductor, and the first metal layer;

forming a protective layer on the gate insulating film; and forming a pixel electrode on the protective layer, wherein etched side walls of the first metal layer and the second semiconductor layer are substantially aligned with the side wall of the second metal layer.

6. The method device as claimed in claim 5, wherein the first metal layer is made from molybdenum (Mo) or titanium (Ti).

7. The method as claimed in claim 5, wherein the second metal layer is formed from or aluminum (Al), an Al alloy, copper (Cu) and a Cu alloy.

* * * * *